United States Patent
Beitelschmidt et al.

(10) Patent No.: US 11,623,614 B2
(45) Date of Patent: Apr. 11, 2023

(54) MOTOR VEHICLE WIPER BLADE

(71) Applicant: Bayerische Motoren Werke Aktiengesellschaft, Munich (DE)

(72) Inventors: Maximilian Beitelschmidt, Munich (DE); Martin Hampel, Munich (DE); Thomas Krammel, Munich (DE); Simon Kuhn, Taufkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/284,350

(22) PCT Filed: Sep. 13, 2019

(86) PCT No.: PCT/EP2019/074468
§ 371 (c)(1),
(2) Date: Apr. 9, 2021

(87) PCT Pub. No.: WO2020/074212
PCT Pub. Date: Apr. 16, 2020

(65) Prior Publication Data
US 2021/0354665 A1    Nov. 18, 2021

(30) Foreign Application Priority Data
Oct. 11, 2018   (DE) .................. 10 2018 125 158.0

(51) Int. Cl.
*B60S 1/38*  (2006.01)
*B60S 1/04*  (2006.01)

(52) U.S. Cl.
CPC .......... *B60S 1/3808* (2013.01); *B60S 1/3806* (2013.01); *B60S 1/0408* (2013.01); *B60S 2001/3836* (2013.01)

(58) Field of Classification Search
CPC ...... B60S 1/3806; B60S 1/3808; B60S 1/381; B60S 1/0408; B60S 1/3881; B60S 2001/3827; B60S 2001/3836
(Continued)

(56) References Cited

U.S. PATENT DOCUMENTS

| | | | | |
|---|---|---|---|---|
| 2,794,203 A | * | 6/1957 | Oishei | B60S 1/381 15/250.44 |
| 5,392,489 A | * | 2/1995 | Mohnach | B60S 1/3806 15/250.201 |

(Continued)

FOREIGN PATENT DOCUMENTS

| | | |
|---|---|---|
| DE | 100 14 803 A1 | 10/2001 |
| DE | 103 40 140 A1 | 3/2005 |

(Continued)

OTHER PUBLICATIONS

Machine translation of description portion of German publication 102006024664, published Nov. 2007. (Year: 2007).*

(Continued)

*Primary Examiner* — Gary K. Graham
(74) *Attorney, Agent, or Firm* — Crowell & Moring LLP

(57) ABSTRACT

A motor vehicle wiper blade includes a spoiler which extends along a longitudinal direction and a lip disposed on the spoiler. The spoiler has, along the longitudinal direction, a cutout which extends in a direction of the lip. The motor vehicle wiper blade has an inner circle side and an outer circle side. The cutout is disposed on the inner circle side of the motor vehicle wiper blade and there is no cutout on the outer circle side of the motor vehicle wiper blade.

6 Claims, 2 Drawing Sheets

(58) Field of Classification Search
USPC .......... 15/250.201, 250.361, 250.43, 250.44; D12/219, 220
See application file for complete search history.

(56) References Cited

U.S. PATENT DOCUMENTS

| | | | |
|---|---|---|---|
| 7,150,065 B2 * | 12/2006 | Zimmer | B60S 1/524 15/250.04 |
| D549,151 S * | 8/2007 | Janssis | D12/219 |
| 2003/0074763 A1 | 4/2003 | Egner-Walter et al. | |
| 2015/0020338 A1 | 1/2015 | Boland | |

FOREIGN PATENT DOCUMENTS

| | | |
|---|---|---|
| DE | 10 2006 024 664 A1 | 11/2007 |
| DE | 10 2007 033 682 A1 | 4/2008 |
| DE | 10 2012 210 542 A1 | 12/2013 |
| DE | 10 2015 204 547 A1 | 9/2016 |
| DE | 10 2016 010 836 A1 | 3/2017 |
| DE | 10 2015 225 899 A1 | 6/2017 |
| EP | 2 889 192 A2 | 7/2015 |

OTHER PUBLICATIONS

Machine translation of description portion of German publication 102012210542, published Dec. 2013. (Year: 2013).*
PCT/EP2019/074468, International Search Report dated Dec. 2, 2019 (Two (2) pages).
German Search Report issued in German application No. 10 2018 125 158.0 dated Sep. 9, 2019, with Statement of Relevancy (Eight (8) pages).

* cited by examiner

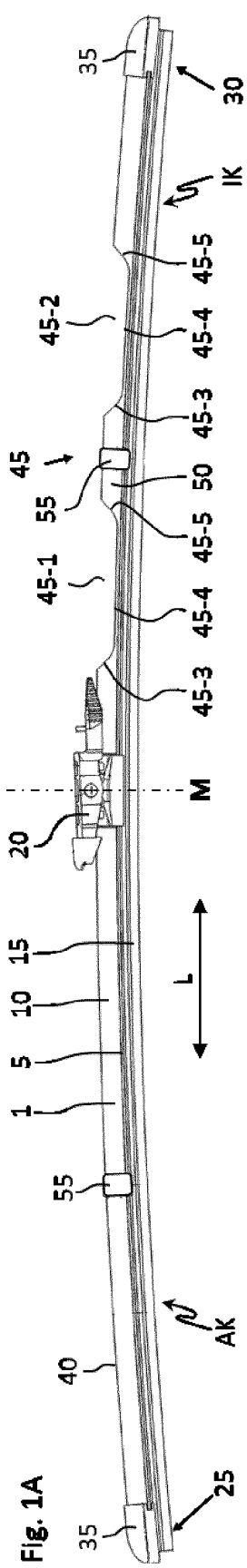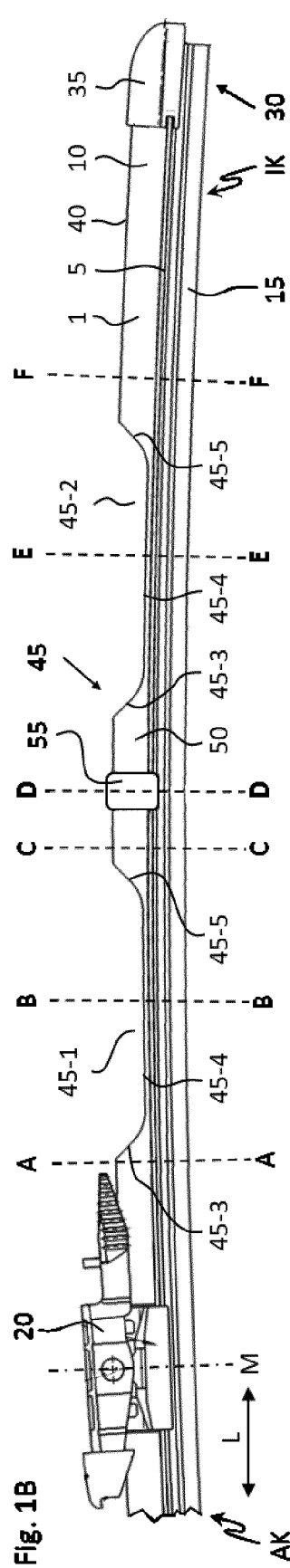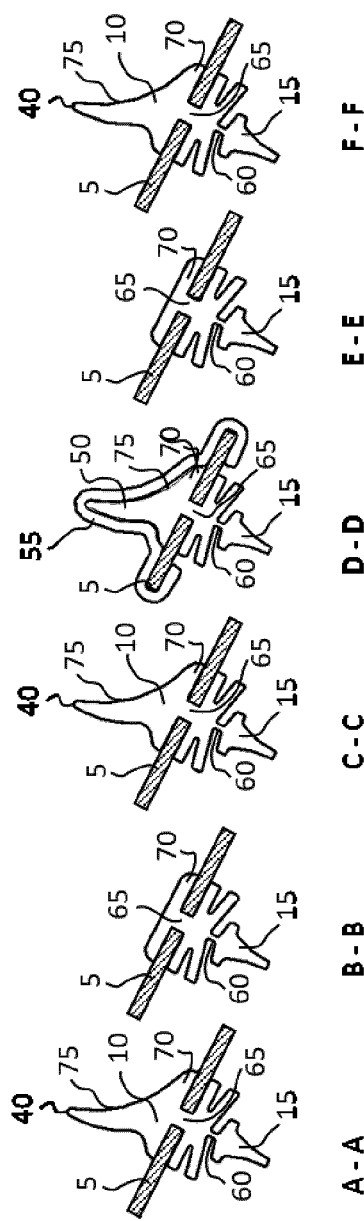
Fig. 1A
Fig. 1B
Fig. 1C

MOTOR VEHICLE WIPER BLADE

BACKGROUND AND SUMMARY OF THE INVENTION

The present invention relates to a motor vehicle wiper blade.

Motor vehicle window wiper apparatuses typically have a wiper arm to which a motor vehicle wiper blade is fastened. This motor vehicle wiper blade has a spoiler on the top side. On the bottom side, there is located the wiper lip which contacts a window to be wiped. For the purpose of moving the wiper arm from a first reversal point (that is to say the starting position of the wiper arm in the case of a motor vehicle window wiper apparatus which is not in operation) to a second reversal point (that is to say a maximum deflection position of the wiper arm in the case of a motor vehicle window wiper apparatus which is in operation) and back, the arm is fastened to an electromotively driven shaft. That part of the wiper arm or of the motor vehicle wiper blade arranged thereon which is adjacent to the shaft is located on the so-called inner circle side of the wiper arm, whereas that part of the wiper arm or of the motor vehicle wiper blade arranged thereon which is distally remote from the shaft is located on the so-called outer circle side of the wiper arm. Corresponding exemplary motor vehicle window wiper apparatuses are known from DE 10 2007 033 682 A1 and DE 10 2015 204 547 A1.

DE 10 2016 010 836 A1 discloses a motor vehicle wiper blade having a spoiler and a lip arranged thereon. The spoiler has a cutout, which extends in parabolic fashion along a large part of the longitudinal direction of the spoiler and in the direction of the lip. The cutout known from DE 10 2016 010 836 A1 thus extends from the inner circle side toward the outer circle side of the motor vehicle wiper blade. The cutout has the object of equalizing the pressing pressure of the motor vehicle wiper blade on a motor vehicle window over the length thereof, in particular on the inner circle side and the outer circle side.

However, in practice, the known motor vehicle wiper blades, fastened as intended to a motor vehicle, have the following disadvantage: in a relatively high speed range, in particular in a speed range of substantially 60 km/h to 120 km/h, the motor vehicle wiper blades are prone to so-called water pull-in or water pull-back, in the case of which some of the water which has in principle already been removed from a field of view of a motor vehicle occupant is moved into the field of view again during a transition of the wiper arm from the second reversal point back in the direction of the first reversal point. In other words, as in the case of a front window wiper located on the driver's side of a left-hand-drive motor vehicle, during a movement of the motor vehicle wiper blade from the maximum deflection position of the wiper arm in the region of the A pillar back to the first reversal point, water is moved over a substantial part of the length of the known motor vehicle wiper blade back onto the front window which has in principle been freed from water. The resulting streaks of water can have a considerable width of up to 25 cm, as a result of which a visual effect which is distracting for a vehicle occupant is disadvantageously produced on the motor vehicle window edge side.

It is an object of the present invention to overcome the aforementioned disadvantage.

The object is achieved by way of a motor vehicle wiper blade having a spoiler which extends along a longitudinal direction, and a lip which is arranged thereon, wherein the spoiler has, along its longitudinal direction, a cutout which extends in the direction of the lip. The motor vehicle wiper blade according to the invention is distinguished by the fact that the cutout is located on the inner circle side of the motor vehicle wiper blade, whereas there is no cutout provided on the outer circle side of the motor vehicle wiper blade. Advantageously, water pull-in or water pull-back by a motor vehicle wiper blade in the case of a motor vehicle moving at a speed of 60 km/h to 120 km/h is thereby avoided. It should be noted that the inner circle side of the motor vehicle wiper blade can extend from an extremal end of the wiper blade substantially to its, as viewed in the longitudinal direction, mounting circle (which for reasons of simplicity is also referred to below as the "center"). Particularly advantageously, the inner circle side of the motor vehicle wiper blade extends from an extremal end of the wiper blade substantially to a point where a fastening means, which is known per se, for fastening the motor vehicle wiper blade to a wiper arm is positioned. The fastening itself is advantageously effected at the mounting circle.

According to a preferred embodiment, the cutout has a first cutout portion and at least a second cutout portion. This makes it possible for the motor vehicle wiper blade according to the invention to be adapted for example to a determined front window geometry in a simple manner. In principle, the geometry of the cutout portion itself or of the cutout portions themselves can be freely selected in a suitable manner. It is thus preferably possible for the first cutout portion to have, on its top side facing away from the lip, a contour profile which differs from a contour profile of the second cutout portion or a contour profile which is identical thereto. Advantageously, the two cutout portions have a substantially identical length. Particularly advantageously, the respective length of the two cutout portions corresponds substantially to the length of the spoiler on the inner circle side that has no cutout portion.

The motor vehicle wiper blade according to the invention can also be advantageously adapted in that the cutout has a first cutout portion and at least a second cutout portion which are separated from one another by a respective spoiler portion.

An at least partial fastening of the motor vehicle wiper blade according to the invention to a wiper arm is advantageously effected in a simple manner if, on at least one spoiler portion, there is located at least one fastening means which is configured to connect the spoiler portion to the wiper arm in a force-fitting and/or form-fitting manner. Preferably, the fastening is effected in the center of the wiper blade, at the mounting circle. Particularly advantageously, the fastening means is configured in the form of a spring clip which, while reaching over the spoiler portion, engages into a latching point arranged on the wiper arm.

According to a preferred embodiment of the motor vehicle wiper blade, provision is made for the cutout to have a first cutout portion with a first side facing the lip, a second cutout portion adjacent thereto with a second side facing the lip and a third cutout portion adjacent to the second cutout portion with a third side facing the lip, wherein the spacing of the top side of the first side from the lip is smaller than the spacing of the top side of the second side from the lip, and the spacing of the top side of the third side from the lip is greater than the spacing of the top side of the first side from the lip. In this way, a motor vehicle wiper blade which is simple to produce and which nevertheless acts in a reliable manner is advantageously provided.

In principle, the cutout portion can have any suitable geometry and, in particular at its left and/or right end, as viewed in the longitudinal direction, can have a straight step or flank. Particularly advantageously, the motor vehicle wiper blade has at least one cutout portion with at least one flank which is inclined in relation to the longitudinal direction.

Advantageously, the length of the first cutout portion is smaller than the length of the second cutout portion. The length of the third cutout portion is advantageously smaller, particularly advantageously several times smaller, in particular three to 10 times smaller, than the first cutout portion and/or the second cutout portion.

According to a further preferred embodiment, the cutout portion(s) is/are positioned on the inner circle side so as to be closer to a longitudinal center or the mounting circle of the motor vehicle wiper blade than to that end thereof which is distally remote from the longitudinal center. In this way, the avoidance of water pull-in or water pull-back is advantageously further improved.

Below, there follows a brief description of figures of the present invention.

BRIEF DESCRIPTION OF THE DRAWINGS

FIG. 1A shows a side view of a first embodiment of a motor vehicle wiper blade according to the invention.

FIG. 1B shows an enlarged detail of the motor vehicle wiper blade illustrated in FIG. 1A.

FIG. 1C shows six cross sections through the motor vehicle wiper blade illustrated in FIG. 1B.

DETAILED DESCRIPTION OF THE DRAWINGS

Figure 2A:
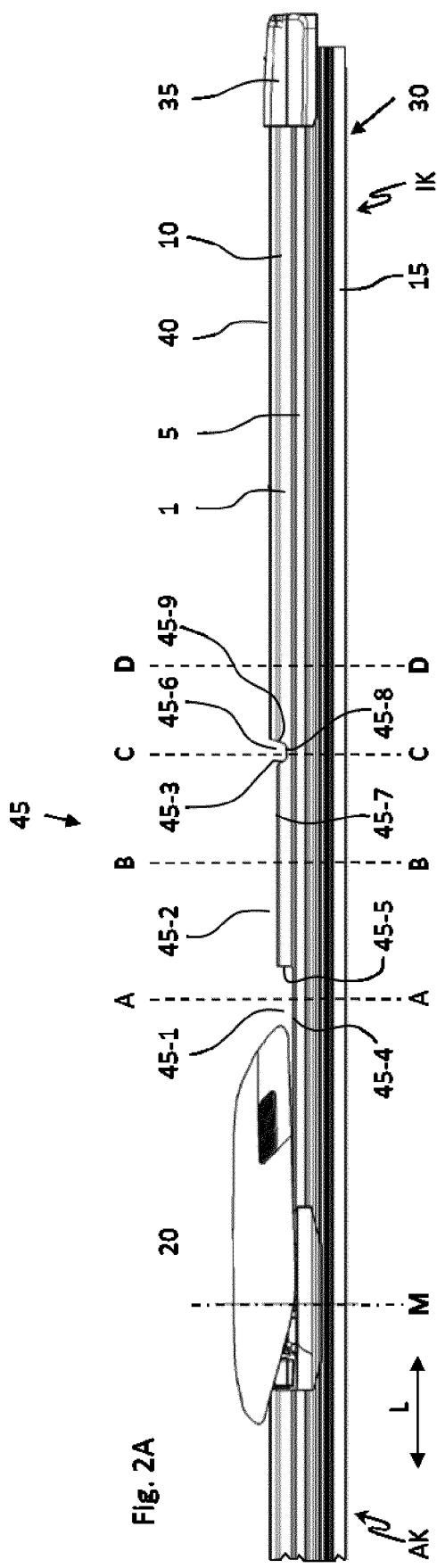
FIG. 2A shows a side view of a part of a second embodiment of a motor vehicle wiper blade according to the invention.

A more detailed and non-prejudicial, in particular non-limiting, description of exemplary embodiments of the present invention is given below with reference to FIGS. 1A to 2B, which are not true to scale. Identical elements are provided with identical reference designations, unless indicated otherwise.

As can be seen from FIG. 1A, a motor vehicle wiper blade 1 has a spring rail 5 to which a spoiler 10 and a lip 15 arranged thereon are fastened. The aforementioned elements extend in a longitudinal direction L, wherein, in the region of the longitudinal center M of the motor vehicle wiper blade 1, there is located a fastening means 20, which is known per se, for fastening the motor vehicle wiper blade 1 to a wiper arm of a motor vehicle (in each case not shown). At its left extremal end 25 and right extremal end 30 in FIG. 1A, the motor vehicle wiper blade 1 has a respective terminating piece 35 which is configured in the form of an end cap and which covers the respective end portions of the spring rail 5 and of the spoiler 10.

The motor vehicle wiper blade 1 has, on its left-hand side in FIG. 1A, an outer circle side AK which reaches from the left extremal end 25 to the longitudinal center M. On its right-hand side in FIG. 1A, the motor vehicle wiper blade 1 has an inner circle side IK which reaches from the right extremal end 30 to the longitudinal center M.

On the outer circle side AK, the spoiler 10 has, as viewed in the longitudinal direction L, a constant profile, that is to say a top side 40 with a linear, continuous profile. By contrast, on the inner circle side IK, the spoiler 10 has a cutout 45 which, according to the present exemplary embodiment, comprises a first cutout portion 45-1 and a second cutout portion 45-2 which is adjacent thereto and which is spaced apart therefrom by a spoiler portion 50.

The first cutout portion 45-1 is configured with a first, inclined flank 45-3 which is adjacent to the fastening means 20 and which is adjoined by a side 45-4 which is substantially parallel to the spring rail 5 or the top side 40. At the end on the right in FIG. 1A, the side 45-4 is adjoined by a flank 45-5 which, with respect to an axis (not shown here) which is parallel to the center line M and which runs through the side 45-4, is designed to be mirror-symmetrical to the flank 45-3 and is formed in the spoiler portion 50. In principle, the transition from the flank 45-3 to the side 45-4 or from the flank 45-5 to the side 45-4 can have any suitable shape; in the exemplary embodiment shown here, the flanks 45-3 and 45-5 transition into the side 45-4 in an arcuate manner.

The second cutout portion 45-2 can have a shape which differs from the shape of the first cutout portion 45-1. However, according to the exemplary embodiment shown here, the first cutout portion 45-1 and the second cutout portion 45-2 are of an identical configuration.

For the purpose of fastening the spoiler 10, also provided in addition to the already mentioned terminating pieces 35 are two further fastening means 55 known per se, which reach over the spoiler 10 and one of which is located on the outer circle side AK and the other is located on the inner circle side IK, specifically on the spoiler portion 50.

FIG. 1B shows the inner-circle-side part of the motor vehicle wiper blade 1 again in an enlarged side view. In addition, six cross sections A-A to F-F can be seen, which are in each case illustrated in more detail in FIG. 1C.

That part of the motor vehicle wiper blade 1 which is shown as per section A-A has a construction and a contour which correspond to the construction and the contour of the motor vehicle wiper blade 1 on the outer circle side AK and also to the construction and the contour of the motor vehicle wiper blade 1 as per section F-F. As is known per se from the prior art, the spoiler 10 and the lip 15 are configured in one part to form a tilting web 60 and are pulled in the longitudinal direction L via the spring rail 5 which has a gap 65. In this way, a foot region 70 rests on the spring rail 5, a spoiler edge 75 projecting from the region.

As can be seen from section B-B and section E-E, the spoiler 10 just has a foot region 70 in the first cutout portion 45-1 and the second cutout portion 45-2, respectively, whereas the spoiler edge 75 has been dispensed with. This advantageously changes the aerodynamics of the motor vehicle wiper blade 1 in such a way that water pull-in or water pull-back on a motor vehicle window of a motor vehicle moving at substantially 60 km/h to 120 km/h (in each case not shown) is avoided in the course of a movement of the motor vehicle wiper blade 1 from the second reversal point back to the first reversal point.

The two cutout portions 45-1 and 45-2 shown in the exemplary embodiment as per FIGS. 1A to 1C have an identical contour, as already mentioned. However, this is not necessarily always the case; rather, it is also possible for a different configuration, in particular a different contour, of the two cutout portions 45-1 and 45-2 to be provided. It is thus possible for the foot region 70 in the first cutout portion 45-1 to be designed differently to the foot region 70 of the second cutout portion 45-2. Alternatively or additionally, it may be envisaged to provide a respective spoiler edge 75 on one or both cutout portions 45-1 and 45-2, the spoiler edges being identical to, or different from, one another and also different from the spoiler edge 75 in the region of the outer circle and/or other portions of the motor vehicle wiper blade 1.

Figure 2B:
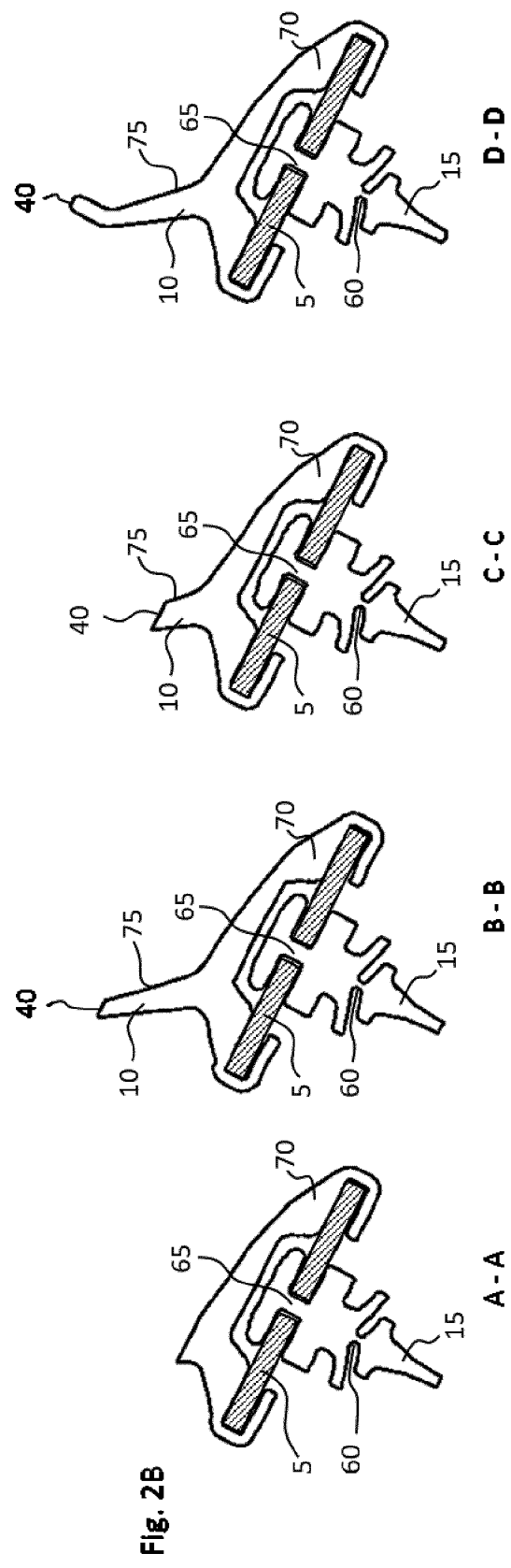
FIG. 2B shows four longitudinal sections through the motor vehicle wiper blade illustrated in FIG. 2A.

The number and/or position of cutout(s) on the motor vehicle wiper blade 1 can also be selected, as emerges from the alternative exemplary embodiment shown in FIGS. 2A and 2B.

Shown in FIG. 2A, which corresponds to the form of illustration of FIG. 1B, is the inner circle side IK of a motor vehicle wiper blade 1, in which the cutout has three cutout portions 45-1, 45-2 and 45-6 located directly alongside one another.

The first cutout portion 45-1, which is located on the left in FIG. 2A, directly adjoins a fastening means 20 by way of its end located on the left, and in this respect has no flank at the point. By contrast, at its right end, the first cutout portion 45-1 has a flank 45-5 which at the same time forms the left end of the second cutout portion 45-2. According to this exemplary embodiment, the flank 45-5 projects substantially orthogonally from the lower side 45-4 of the first cutout portion 45-1, the side corresponding to the foot region 70 of the spoiler 10.

The second cutout portion 45-2 has a side 45-7 which extends in the longitudinal direction L and which—just like the side 45-4 or a corresponding side 45-8 of the third cutout portion 45-6—is configured to be substantially parallel to the spring rail 5.

That end of the second cutout portion 45-2 which is on the right in FIG. 2A is configured in the form of a flank 45-3 which extends in the direction of the lower side 45-8. Located opposite the flank is a further, now inclined, flank 45-9 which forms that end of the third cutout portion 45-6 which is located on the right in FIG. 2A.

In FIG. 2A, four cross sections A-A to D-D can further be seen, which are in each case illustrated in more detail in FIG. 2B.

That part of the motor vehicle wiper blade 1 which is shown as per section A-A has a construction and a contour which correspond to the construction and the contour of the motor vehicle wiper blade 1 without a spoiler edge 75 or a minimum extent of a spoiler edge 75.

Those parts of the motor vehicle wiper blade 1 which are shown as per sections B-B and C-C have a respective spoiler edge 75, but these edges each have heights which differ from one another and have different contours. Thus, the spacing of the top side of the first side 45-4 from the lip 15 is smaller than the spacing of the top side of the second side 45-7 from the lip 15, and the spacing of the top side of the third side 45-8 from the lip 15 is greater than the spacing of the top side of the first side 45-4 from the lip 15 but is smaller than the spacing of the top side of the second side 45-7 from the lip 15.

Finally, that part of the motor vehicle wiper blade 1 which is shown as per section D-D has a construction and a contour which correspond to the construction and the contour of the motor vehicle wiper blade 1 on the outer circle side AK.

LIST OF REFERENCE CHARACTERS

1 Motor vehicle wiper blade
5 Spring rail
10 Spoiler
15 Lip
20 Fastening means
25 Left extremal end
30 Right extremal end
35 Terminating piece
40 Top side
45 Cutout
45-1 First cutout portion
45-2 Second cutout portion
45-3 Flank
45-4 Side
45-5 Flank
45-6 Third cutout portion
45-7 Side
45-8 Side
45-9 Flank
50 Spoiler portion
55 Fastening means
60 Tilting web
65 Gap
70 Foot region
75 Spoiler edge
A-A Section
B-B Section
C-C Section
D-D Section
E-E Section
F-F Section
IK Inner circle side
AK Outer circle side
L Longitudinal direction
M Longitudinal center

What is claimed is:

1. A motor vehicle wiper blade, comprising:
   a spring rail; and
   a spoiler which extends along a longitudinal direction, wherein a lip is disposed on the spoiler and wherein the spoiler is fastened to the spring rail;
   wherein the spoiler has, along the longitudinal direction, at least a first cutout portion and a second cutout portion which extend in a direction of the lip;
   wherein the motor vehicle wiper blade has an inner circle side and an outer circle side;
   wherein the first and second cutout portions are disposed on the inner circle side of the motor vehicle wiper blade;
   wherein there is no cutout portion on the outer circle side of the motor vehicle wiper blade;
   wherein a first fastener is disposed on the spoiler at a longitudinal center of the motor vehicle wiper blade and wherein the first fastener connects the spoiler to a wiper arm in a force-fitting manner and/or a form-fitting manner;
   wherein at a left distal end and at a right distal end of the motor vehicle wiper blade a respective terminating piece which is configured in a form of an end cap covers respective end portions of the spring rail and of the spoiler;
   wherein a second fastener and a third fastener reach over the spoiler and wherein the second fastener is disposed on the spoiler on the outer circle side and the third fastener is disposed on the spoiler on the inner circle side for fastening the spoiler;
   and wherein the first and second cutout portions are configured such that aerodynamics of the motor vehicle wiper blade are changed in a way such that water pull-in or water pull-back on a motor vehicle window when the motor vehicle is moving at a speed of 60 kilometer/hour to 120 kilometer/hour is avoided in a course of a movement of the motor vehicle wiper blade from a second reversal point back to a first reversal point.

2. The motor vehicle wiper blade according to claim 1, wherein the first cutout portion has a contour profile which differs from a contour profile of the second cutout portion or the contour profile of the first cutout portion is identical to the contour profile of the second cutout portion.

3. The motor vehicle wiper blade according to claim 1, wherein the first cutout portion and the second cutout portion are separated from one another by a spoiler portion.

4. The motor vehicle wiper blade according to claim 1, wherein the first cutout portion has a first side facing the lip, the second cutout portion is adjacent to the first cutout portion with a second side facing the lip, and wherein the spoiler has a third cutout portion adjacent to the second cutout portion with a third side facing the lip, wherein a spacing of a top side of the first side from the lip is smaller than a spacing of a top side of the second side from the lip, and wherein a spacing of a top side of the third side from the lip is greater than the spacing of the top side of the first side from the lip.

5. The motor vehicle wiper blade according to claim 1, wherein the spoiler has a third cutout portion and wherein at least one of the cutout portions has a flank which is inclined in relation to the longitudinal direction.

6. The motor vehicle wiper blade according to claim 1, wherein the spoiler has a third cutout portion and wherein the cutout portions are disposed on the inner circle side closer to the longitudinal center of the motor vehicle wiper blade than to the right distal end of the motor vehicle wiper blade.

* * * * *